United States Patent

[11] 3,602,950

[72] Inventor Friedrich Bernd Bielfeldt
 Pappenheim, Germany
[21] Appl. No. 791,331
[22] Filed Jan. 15, 1969
[45] Patented Sept. 7, 1971
[73] Assignee Eckert & Ziegler GmbH
 Weissenburg, Bayern, Germany
[32] Priority Jan. 19, 1968
[33] Germany
[31] P 17 29 152.0

[54] INJECTION MOLDING MACHINE
 12 Claims, 2 Drawing Figs.
[52] U.S. Cl. .................................................. 18/12 SA,
 18/30 SR
[51] Int. Cl. ...................................................... B29f 3/06,
 B29f 3/08
[50] Field of Search ........................................... 18/12 SF,
 12 SA, 30 Y, 30 SR, 30 SQ, 12 SM, 12 SS, 12 SE,
 12 SB, 30 SM, 30 SS

[56] References Cited
UNITED STATES PATENTS
2,743,812  5/1956  Ljungberg ...................... 18/12 SM UX
3,164,375  1/1965  Frenkel ......................... 18/12 SM UX
2,496,625  2/1950  Henning ........................ 18/12 B X
3,065,502  11/1962 Lovenian ....................... 18/12 SF
3,121,914  2/1964  Alson et al. .................... 18/12 SF X
3,169,275  2/1965  Compton et al. ............... 18/12 SA X
3,427,639  2/1969  Strauss .......................... 18/30 SR
3,499,187  3/1970  Cohen ............................ 18/12 SF Primary Examiner—J. Spencer Overholser
Assistant Examiner—R. L. Spicer, Jr.
Attorney—Michael S. Striker ABSTRACT: An injection molding machine for thermosetting plastic material which comprises a heatable cylinder having a constant internal diameter, and a rotary and axially movable screw which transports plastic material toward the outlet of the cylinder. The diameter of the screw thread decreases gradually toward the tip of the screw along an intermediate portion whose axial length is between one and eight times the maximum diameter of the screw. The diameter of the core in the intermediate portion of the screw also decreases gradually but the pitch of threads on such intermediate portion increases toward the tip. This reduces wear on the internal surface of the cylinder and on the external surface of the screw.

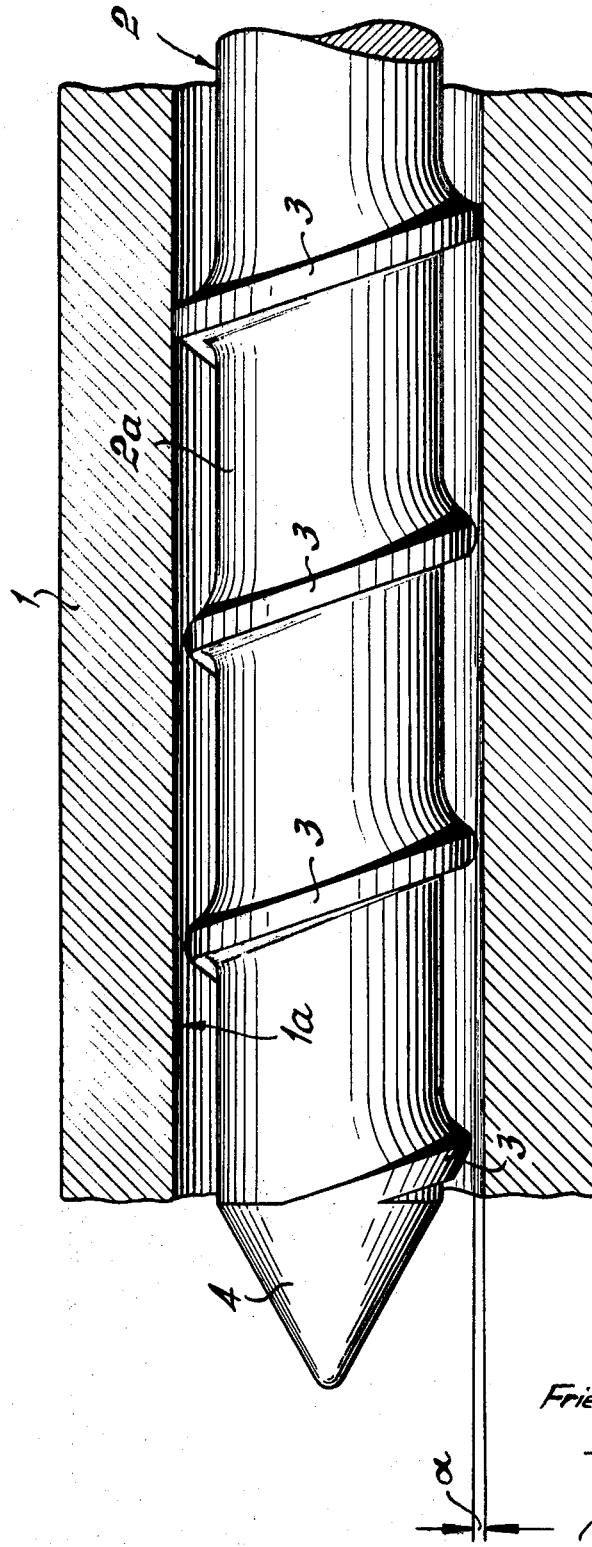

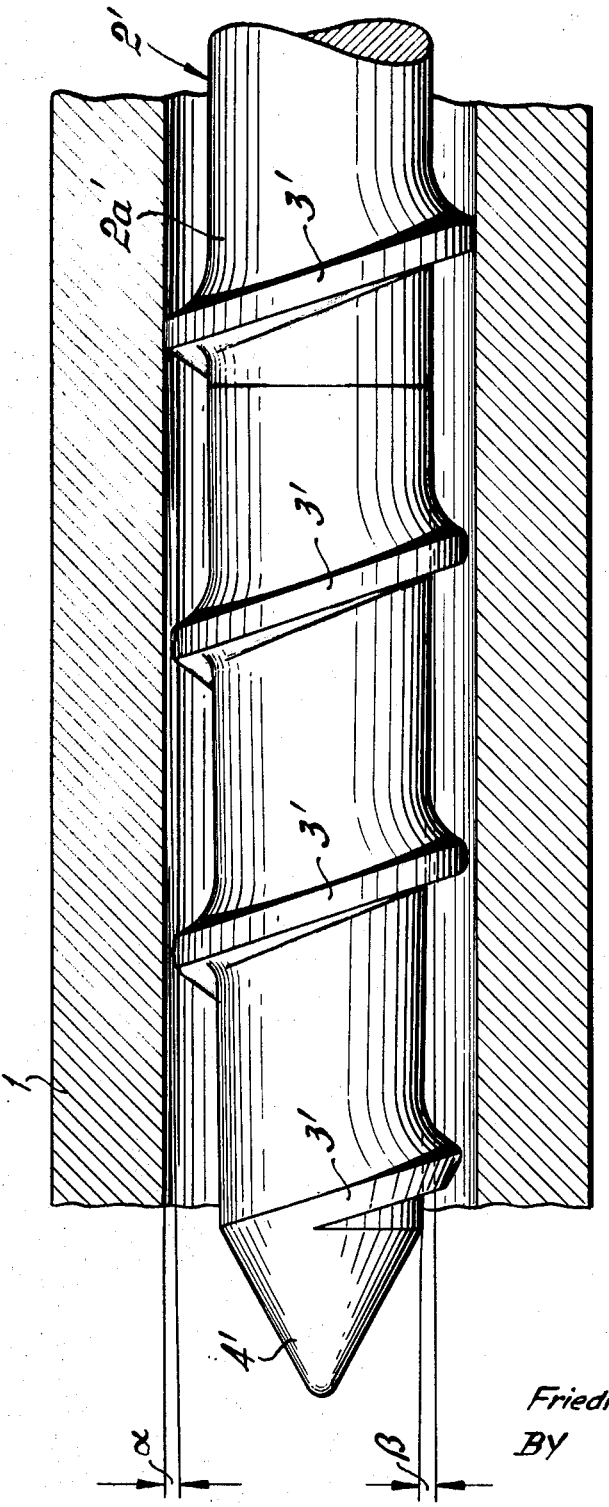

INJECTION MOLDING MACHINE

BACKGROUND OF THE INVENTION

The present invention relates to injection molding machines in general, and more particularly to improvements in injection molding machines which are primarily intended for the production of shaped articles from thermosetting plastic materials.

At the present time, articles of thermosetting plastic material are produced predominantly by compression and transfer molding. It is also known to produce such articles by injection molding, i.e., in the same way as thermoplastic articles. An injection molding machine normally comprises a heatable cylinder and a screw which is rotatable and axially movable in the cylinder to transport plasticized material toward and to expel such material through the outlet of the cylinder. An important advantage of injection molding machines is that their cylinders can be installed in horizontal position and that their operation can be programmed so that the production of articles can be carried out with minimal supervision and with substantial savings in wages.

Heretofore known injection molding machines for the production of articles from thermosetting plastic materials are practically identical with machines which are used for injection or jet molding of thermoplastic substances. The main difference is that the mold is heated, preferably electrically, and that the cylinder and its screw are readily exchangeable. As a rule, the cylinder is heated by circulating fluid to insure that the temperature which is necessary for processing of duroplasts and other thermosetting materials remains constant.

A drawback of presently known injection molding machines for the production of articles from synthetic thermosetting plastic materials is that their parts, particularly the cylinder and the screw, undergo excessive wear. This is due to the following. Thermosetting materials which are ready to be introduced into a heated or heatable mold are not homogeneous substances. Such materials consist mainly of a mixture of hardenable resin and one or more fillers. The fillers determine the quality, versatility and other characteristics of finished products as regards their resistance to heat, compression strength, resistance to wear, hardness, elasticity and other desirable qualities. Such fillers may include glass fibers, rock flour, wood flour, rubber flour, other types of finely comminuted solid material and/or particles of woven textiles or the like. The percentage of fillers in the mixture is high, not only in order to reduce the cost of articles but also to enhance their strength and/or other desirable characteristics. Certain fillers (particularly glass fibers, rock flour and other anorganic substances) are highly abrasive. Therefore, such fillers cause rapid and very pronounced wear on the surfaces of the cylinder and screw in an injection molding machine, especially if their percentage in the mixture is high. As a rule the thermoplastic resin is present in relatively small quantities and merely acts as a binder for particles of filler material, not unlike the binder in mixtures which are used for the production of grinding discs or the like. Depending on the degree of preliminary condensation, duroplasts and other mixtures of thermosetting resins with fillers are normally furnished in the form of a tough mass or in the form of relatively hard fragments wherein the particles of filler material are surrounded by thermosetting resin. Due to high sensitivity of such starting materials to temperature changes, the injection molding machine for their conversion into thermosetting articles is normally designed in such a way that the shape of introduced fragments or particles remains unchanged during travel along approximately two-thirds of the overall length of the path between the inlet and outlet of the cylinder. The compression ratio along this stretch of the path is preferably one-to-one, i.e., the screw merely transports the material but does not change its condition. In the last third of the path of travel from the inlet toward the outlet, the thus conveyed material is plasticized due to the action of heat and as a result of friction. This enables the particles of filler material to penetrate through the surrounding layers of thermosetting resin and to cause extensive wear on the adjoining parts of the machine, especially on the smooth internal surface of the cylinder. It was further found that, depending on the composition of introduced starting material, the wear on the machine is often so pronounced that the threads of the screw wear away within a short period of time whereby the screw ceases to transport the material toward and through the outlet of the cylinder. The wear begins at the ridge of the thread, especially if the ridge is sharp. The particles of filler material remove the top layer of the thread and fragmentize the layer which is located below such top layer.

SUMMARY OF THE INVENTION

An object of the present invention is to provide an injection molding or jet molding machine for the production of shaped articles, particularly for the production of articles from synthetic thermosetting material, and to construct the machine in such a way that its parts are less likely to wear away and that such increased resistance to wear can be achieved with minimal modifications in the design of existing machines.

Another object of the invention is to provide a novel screw for use in a machine of the just outlined character.

A further object of the invention is to provide an injection molding machine which can be used with equal or nearly equal advantage for the production of shaped articles from synthetic thermoplastic or thermosetting materials.

An additional object of the invention is to provide an injection molding or jet molding machine which can employ presently known molds and presently known cylinders.

Still another object of the instant invention is to provide a machine which can be used for processing of different types of thermosetting materials including those containing a high percentage of abrasive fillers.

The improved machine comprises a heatable cylinder defining a passage of preferably constant diameter and having an inlet for admission of plastic material (e.g., a mixture of a thermosetting resin with one or more fillers) and an outlet which is spaced from the inlet in axial direction of the cylinder, and a screw which is received in the passage and is rotatable and axially movable therein to thereby transport plastic material from the inlet toward the outlet and to expel such material through the outlet. The screw has a front end portion or tip which is preferably of conical shape and an intermediate portion which is adjacent to and tapers toward the front end portion. The axial length of the intermediate portion is between one and eight times (preferably between three and five times) the maximum diameter of the screw. Such taper may be due to preferably gradually decreasing diameter of the thread on the core of the screw and/or to preferably gradually decreasing diameter of the core of the screw. Additional reduction of wear can be achieved if the ridge of the thread in the intermediate portion of the screw is bounded by a strongly rounded surface, preferably by a surface having a radius of curvature which is at least one-fortieth of the maximum diameter of the screw, and if the pitch of the thread along the intermediate portion of the screw increases in a direction toward the tip.

The novel features which are considered as characteristic of the invention are set forth in particular in the appended claims. The improved injection molding machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a first injection molding machine; and FIG. 2 is a similar fragmentary axial sectional view of a second injection molding machine.

DESCRIPTION OF THE PREFERRED EMBODIMENTS

FIG. 1 illustrates a portion of an injection molding machine for the production of shaped articles from thermosetting plastic material. The machine comprises a cylinder 1 defining a passage 1a which is bounded by a smooth cylindrical internal surface of constant diameter. The inlet of the cylinder 1 is located to the right and its outlet to the left of FIG. 1. The passage 1a accommodates an axially movable rotary screw 2 having a core 2a of constant diameter and an external helical thread 3. The front end portion or tip 4 of the screw 2 is of conical shape and tapers in the direction of transport of starting material which is admitted via inlet and travels toward and beyond the tip 4. Rotation of the screw 2 causes the starting material to move forwardly and its axial movement causes injection of such material into one or more molds, not shown. The cylinder 1 and the mold or molds are heated in the customary way. The diameter of an intermediate portion of the screw 2 (namely, of that portion which is immediately adjacent to the tip 4) decreases gradually toward the tip, i.e., such intermediate portion tapers in the direction of material travel due to the fact that the diameter of its thread 3 decreases toward the tip 4. The taper is denoted by the angle alpha which is rather small. The length of such intermediate portion is between one and eight times the maximum diameter of the screw 2, preferably between three and five times the maximum diameter. The taper of the thread 3 on the core 2a of the screw 2 is plainly visible in FIG. 1. This illustration further shows that the ridge and the root of the thread 3 on the core 2a in the intermediate portion of the screw 2 are bounded by a strongly or pronouncedly rounded surface. The radius of curvature of such surface is preferably at least one-fortieth of the maximum diameter of the screw.

The provision of a thread 3 with a ridge which is bounded by a strongly rounded surface is an advantageous but optional feature of the present invention. Thus, the wear on the cylinder 1 and screw 2 of the injection molding machine shown in FIG. 1 can be reduced sufficiently, at least under certain circumstances, by providing an intermediate portion of the screw with a diameter which decreases gradually toward the tip of the screw. The invention is based on the recognition that the wear is reduced in response to a reduction of shearing effect in the region between the internal surface of the cylinder 1 and the thread 3 of the screw 2, especially between the radially outermost surface of the thread and the internal surface of the cylinder. This ensures that the shearing stresses upon the particles of filler material are reduced with resulting reduction of wear on adjoining surfaces of the cylinder and screw. Since the ridge of the thread 3 is rounded, the particles of filler material can more readily travel therealong and pass thereover so that such particles are less likely to erode the surface of the thread. It was found that the combination of the aforedescribed two features prolongs the useful life of the machine so that the cylinder and/or the screw must be replaced at less frequent intervals.

FIG. 2 illustrates a portion of a second injection molding machine which includes a cylinder 1 and a modified screw 2'. The intermediate portion of this screw tapers in the same way as described in connection with FIG. 1 and the ridge of its thread 3' is also rounded in the same way, not only at the top land but also at the root where the thread merges into a modified core 2a'. The diameter of the core 2a' in the intermediate portion of the screw 2' tapers toward the tip 4' as indicated by the small angle beta. Such taper of the core 2a' ensures that the pressure to which the conveyed material is subjected decreases or does not increase beyond a certain pressure which would contribute to generation of excessive shearing stresses with resulting wear on the surfaces of the cylinder 1 and screw 2'.

In accordance with a further advantageous optional feature of the invention, the pitch of the thread 3 or 3' on the screw 2 or 2' increases in the intermediate portion of the screw toward the tip 4 or 4'. This feature can be resorted to instead of employing a tapering core 2a' or in addition to the utilization of a tapering core. In accordance with a presently preferred embodiment of the invention, the screw is designed in a manner as shown in FIG. 2 and with the additional provision of a thread whose pitch increases toward the tip 4'. The compression ratio of the structure shown in FIG. 2 (namely, compression of conveyed material in the space surrounding the intermediate portion of the screw 2') is less than one, preferably between 0.7 and one. This ensures that the cross-sectional area of the path for the transported material increases toward the tip 4' and that the pressure to which the material is subjected does not increase. Consequently, the particles of filler material are not pressed with excessive force against the adjoining surfaces of the cylinder 1 and screw 2' and the useful life of the machine is prolonged beyond expectations.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. In an injection molding machine, particularly for the production of shaped articles from thermosetting synthetic plastic material, a combination comprising a heatable cylinder having an inner surface defining a passage of constant diameter, said cylinder having an inlet for admission of plastic material and an outlet spaced from said inlet; and a feed screw received in said passage, said feed screw having an external helical thread and being rotatable and axially movable in said cylinder to thereby transport plastic material from said inlet towards said outlet and to expel such material through said outlet, said screw having a front end portion and an intermediate portion adjacent to and tapering towards said front end portion, said intermediate portion being located in said passage of constant diameter so as to provide a clearance between said external thread of said intermediate portion and said inner surface of the cylinder which gradually increases towards said front end portion.

2. A combination as defined in claim 1, wherein said front end portion is a conical tip.

3. A combination as defined in claim 2, wherein said helical thread ends short of said conical tip.

4. A combination as defined in claim 2, wherein the angle of taper of said intermediate portion is less than that of said conical tip.

5. A combination as defined in claim 1, wherein the axial length of said intermediate portion is between one and eight times the maximum diameter of said screw.

6. A combination as defined in claim 5, wherein said intermediate portion tapers gradually toward the front end portion of said screw.

7. A combination as defined in claim 1, wherein the axial length of said intermediate portion is between three and five times the maximum diameter of said screw.

8. A combination as defined in claim 1, wherein said external helical thread has a ridge and wherein at least the ridge of the thread on said intermediate portion of the screw is bounded by a strongly rounded surface.

9. A combination as defined in claim 8, wherein the radius of curvature of said rounded surface is at least one-fortieth of the maximum diameter of the screw.

10. A combination as defined in claim 1, wherein said screw includes a core and an external helical thread provided on said core, said core tapering toward said front end portion over the length of said intermediate portion of the screw.

11. A combination as defined in claim 1, wherein the pitch of the thread on said intermediate portion increases gradually in a direction toward said front end portion.

12. A combination as defined in claim 1, wherein said screw comprises a core and an external helical thread on said core, and wherein the pitch of the thread on said intermediate portion increases gradually toward said front end portion of the screw.